United States Patent [19]

Sasaki et al.

[11] Patent Number: 5,150,025
[45] Date of Patent: Sep. 22, 1992

[54] RELOADING SYSTEM FOR PITCH ERROR CORRECTION DATA

[75] Inventors: Takao Sasaki; Kentaro Fujibayashi, both of Tokyo; Shintaro Kageyama, Yamanashi, all of Japan

[73] Assignee: Fanuc Limited, Yamanashi, Japan

[21] Appl. No.: 635,624

[22] PCT Filed: Apr. 24, 1990

[86] PCT No.: PCT/JP90/00532
§ 371 Date: Jan. 2, 1991
§ 102(e) Date: Jan. 2, 1991

[87] PCT Pub. No.: WO90/14622
PCT Pub. Date: Nov. 29, 1990

[30] Foreign Application Priority Data

May 18, 1989 [JP] Japan .................................. 1-125334

[51] Int. Cl.5 ............................................. G05B 19/25
[52] U.S. Cl. ................... 318/571; 364/474.19
[58] Field of Search .............. 318/569, 571, 630, 632; 364/474.35, 474.19

[56] References Cited

U.S. PATENT DOCUMENTS

| | | | |
|---|---|---|---|
| 3,852,719 | 12/1974 | Nishumura et al. | 318/632 X |
| 4,502,108 | 2/1985 | Nozawa et al. | 318/630 |
| 4,514,813 | 4/1985 | Nozawa et al. | 364/474.35 |
| 4,864,508 | 9/1989 | Iwazaya | 364/474.19 |

Primary Examiner—William M. Shoop, Jr.
Attorney, Agent, or Firm—Staas & Halsey

[57] ABSTRACT

A system for reloading pitch error correction data at the time of replacing a movable part constituting part of a mechanical system of a numerically controlled machine tool. A command to reload the pitch error correction data is preset in a machining program at the time of replacing the movable part. A numerical control device reads this command. If a parameter reload command is given (S1), and if it is the pitch error correction data (S2), it is determined whether the movable part is situated at the original position (S3), and the pitch error correction data is automatically reloaded (S4). Accordingly, the operator is not required to carry out any operation related to the reloading of the pitch error correction data, and thus the machining can be effected with the use of correct pitch error correction data.

4 Claims, 2 Drawing Sheets

RELOADING SYSTEM FOR PITCH ERROR CORRECTION DATA

TECHNICAL FIELD

The present invention relates to a reloading system for pitch error correction data in a numerically controlled machine tool, and more particularly, to a reloading system for pitch error correction data in which the pitch error correction data is reloaded, in accordance with a machining program, at the time of replacing a movable part.

BACKGROUND ART

In some numerically controlled machine tools, an attachment must be changed for each workpiece. Namely, if the workpiece is changed, the attachment must be replaced with a new one. If this attachment includes a movable part moved by a ball screw, a pitch error correction is required for each attachment, and thus pitch error correction data must be reloaded each time the attachment is replaced.

When reloading the pitch error correction data, however, usually a counter or the like, as hardware storing coordinate values, must be initialized, and thus the pitch error correction data must be reloaded while the numerical control device is disconnected from the power supply thereto. In general, although the operator can easily replace the attachment and the like, it is difficult to correctly reload the pitch error correction data after the replacement of the attachment, and therefore, the pitch error correction cannot be normally effected, and thus the machining accuracy is lowered.

DISCLOSURE OF THE INVENTION

The present invention has been contrived in consideration of these circumstances, and an object thereof is to provide a reloading system for pitch error correction data in which the pitch error correction data is reloaded, in accordance with a machining program, at the time of replacing a movable part.

To solve the above problem, according to the present invention, there is provided a system for reloading pitch error correction data at the time of replacing a movable part constituting part of a mechanical system of a numerically controlled machine tool, the pitch error correction data reloading system comprising giving a command to reload the pitch error correction data, in accordance with a machining program, at the time of replacing the movable part, whereby the pitch error correction data is reloaded at the time of the replacement of the movable part.

The command to reload the pitch error correction data is preset in a machining program at the time of replacing the movable part, and a numerical control device reads this command and automatically reloads the pitch error correction data. Accordingly, the operator need not perform any operation related to the reloading of the pitch error correction data, and the following machining can be effected with the use of correct pitch error correction data.

BEST MODE OF CARRYING OUT THE INVENTION

One embodiment of the present invention will now be described with reference to the accompanying drawings.

Figure 2:
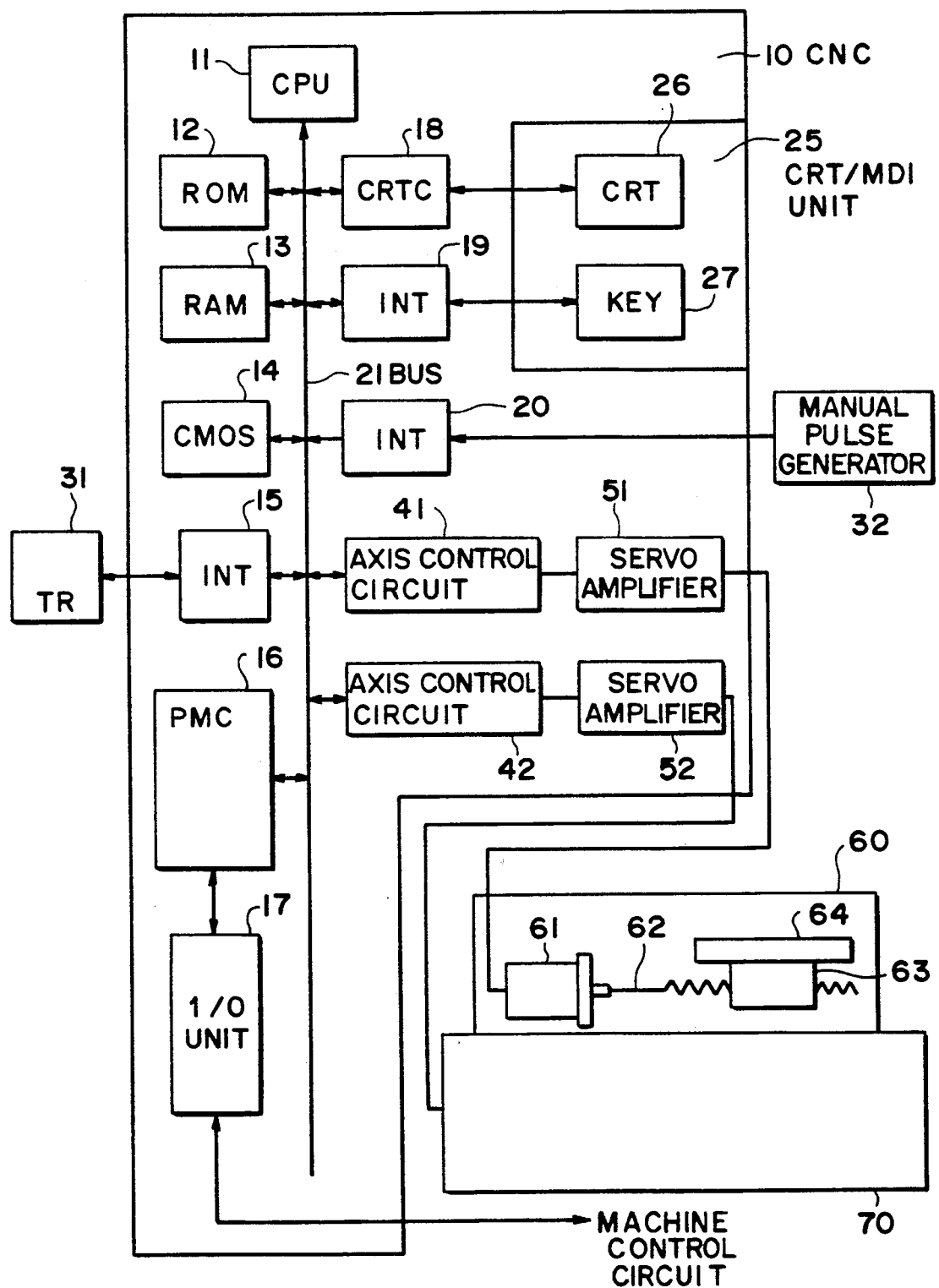
FIG. 2 is a block diagram of the hardware of a numerical control device (CNC) for effecting the present invention.

FIG. 2 is a block diagram of the hardware of a numerical control device (CNC) for effecting the present invention. In FIG. 2, numeral 10 denotes the numerical control device (CNC). A processor 11, which is a central processor for the global control of the numerical control device (CNC) 10, reads out a system program in a ROM 12 through a bus 21, and executes the control of the entire numerical control device (CNC) 10 in accordance with this system program. A RAM 13 stores temporary calculation data, display data, etc.; an SRAM is used as the RAM 13. A CMOS 14 stores pitch error correction data, tool correction value, machining program, parameters, etc. The CMOS 14 also prestores pitch error correction data for each attachment. The CMOS 14, which is backed up by a battery (not shown), continues to act as a nonvolatile memory even when the numerical control device (CNC) 10 is cut off from the power supply, and thus all of the data can be maintained therein.

An interface 15, which is an external-equipment interface, is connected with external equipment 31, including a paper tape reader, paper tape puncher, and paper tape reader/puncher, etc. The machining program is read from the paper tape reader, is edited in the numerical control device (CNC) 10, and is delivered as an output to the paper tape puncher.

A PMC (programmable machine controller) 16, which is contained in the CNC 10, controls the machine side by a sequence program prepared in a ladder format. More specifically, the PMC 16 converts M, S, and T functions, ordered in accordance with a machining program, into signals required on the machine side, and outputs the signals to the machine side through an I/O unit 17. These output signals serve to drive a magnet and the like on the machine side, and to actuate a hydraulic valve, pneumatic valve, and electric actuator, etc. Upon receiving signals from limit switches on the machine side or switches on a machine operator panel, etc., the PMC 16 executes necessary processing and outputs the signals to the processor 11.

A graphic control circuit 18 converts digital data, such as the current position of each axis, alarms, parameters, and picture data, etc., into picture signals, and outputs these signals. These picture signals are output to a display unit 26 of a CRT/MDI unit 25 and are displayed on the display unit 26. An interface 19 receives data from a keyboard 27 in the CRT/MDI unit 25, and outputs the data to the processor 11.

An interface 20, which is connected to a manual pulse generator 32, receives pulses from the manual pulse generator 32. The manual pulse generator 32, which is mounted on the machine operator panel, is used for high-accuracy manual movements of machine movable parts.

Axis control circuits 41 and 42 receive movement commands for the individual axes from the processor 11, and output the commands for the axes to servo amplifiers 51 and 52, respectively. Upon receiving these movement commands, the servo amplifiers 51 and 52 drive a servomotor 61. The servomotor 61 contains a pulse coder for position detection, and position signals from this pulse coder are fed back as a pulse train. A velocity signal can be produced by an F/V (frequency/velocity) conversion of the pulse train. In the drawing, a feedback line and velocity feedback for these position signals are omitted. Further, servomotors, servo amplifiers, spindle motors, spindle amplifiers, etc., other than those for attachments are also omitted.

The servomotor 61 moves a table 64 in an attachment 60 by a ball screw 62 and a nut 63.

The attachment 60, which is located on a base 70, is replaced with a new one for each workpiece, and therefore, after the attachment 60 is replaced, the pitch error correction data must be reloaded. Accordingly, the pitch error correction data is measured and prestored in the CMOS 14 for each attachment, and the pitch error correction data is reloaded in response to a command from the machining program at the time of replacing the attachment.

Figure 1:
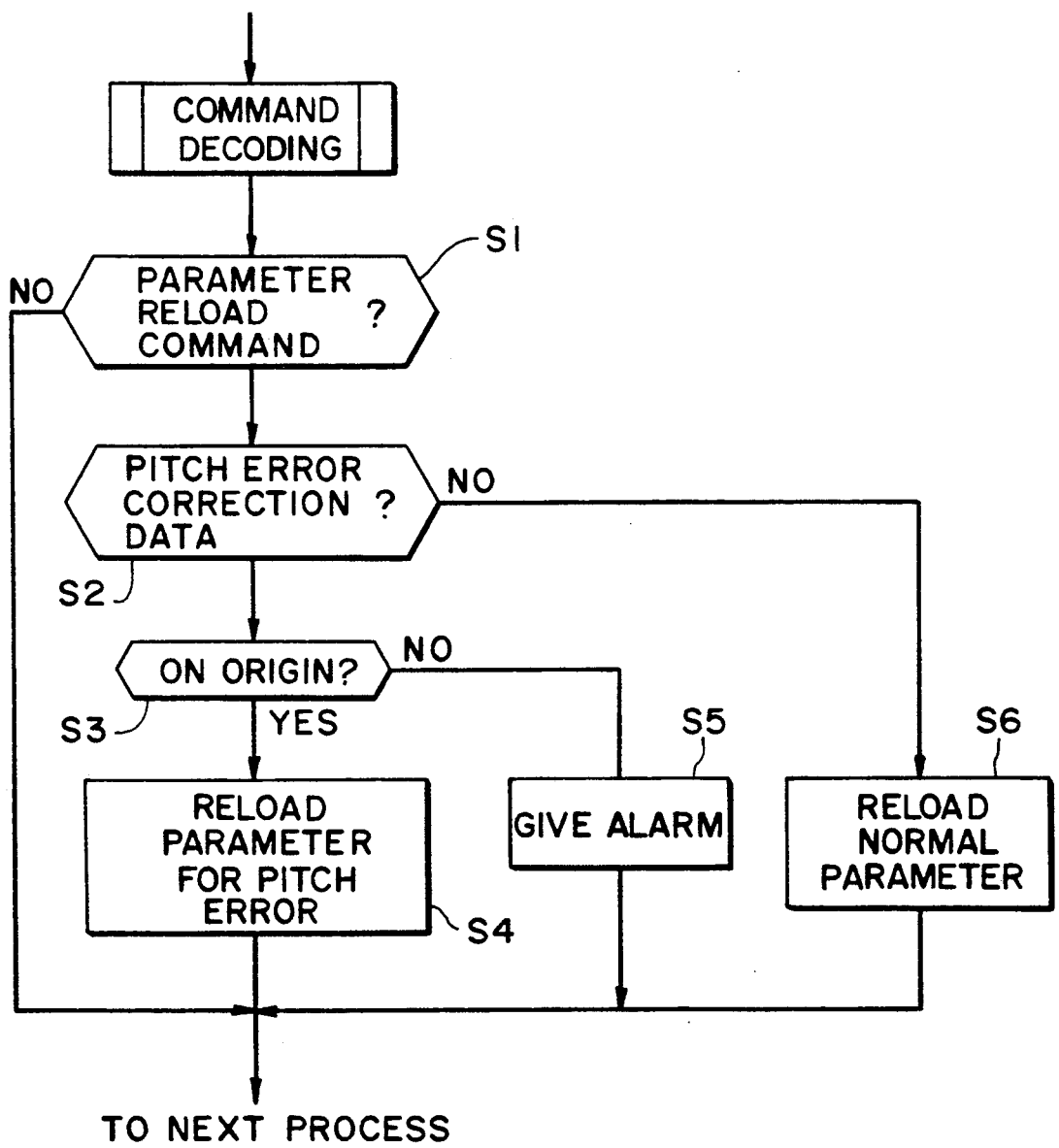
FIG. 1 is a flow chart showing processes in a pitch error correction data reloading system according to the present invention.

The following is a description of the reloading of the pitch error correction data. FIG. 1 is a flowchart showing processes in a pitch error correction data reloading system according to the present invention. In this drawing, the figure following the symbol S designates the step number.

First, the command from the machining program is processed.

In step S1, it is determined whether the command is a command for parameter reloading, and if it is not a reload command, the program proceeds to the next process; if it is the command for parameter reloading, the program proceeds to step S2.

In step S2, it is determined whether the command for parameter reloading is a reload command for the pitch error correction data. If the parameter is not the pitch error correction data, the program proceeds to step S6, and if the parameter is the pitch error correction data, the program proceeds to step S3.

In step S3, it is determined whether a movable part of the attachment is situated at the original position, since the reload command is the pitch error correction data. If the movable part is at the original position, the program proceeds to S4, and if not, the program proceeds to S5.

In step S4, the pitch error correction data is rewritten as data for a new attachment, since the reload command for the pitch error correction data exists and the movable part of the attachment is at the original position.

In step S5, an alarm is given, since the movable part of the attachment is not at the original position, although the reload command for the pitch error correction data exists.

In step S6, the parameter is rewritten in accordance with the command, since the parameter is not the pitch error correction data. The reload command for the pitch error correction data is given by G10.7 Pn;

where G10.7 is the reload command for the pitch error correction data, and n designates the number of the attachment concerned. It is to be understood that G10.7 is given only as an example, and other codes may be used. A command for the return of the attachment to the original position is issued before the output of the reload command for the pitch error correction data.

Since the pitch error correction data for the new attachment is automatically reloaded in this manner, the operator is not concerned with the reloading of the pitch error correction data, and thus there is no possibility of a defective machining attributable to errors in the pitch error correction data.

According to the present invention, as described above, the pitch error correction data for the movable part of a new mechanical system is reloaded in accordance with the machining program, and therefore, since an operation by the operator is not required, problems due to an incorrect operation can be prevented.

We claim:

1. A method for reloading pitch error correction data at the time of replacing a movable part for a mechanical system of a numerically controlled machine tool, the pitch error correction data reloading method comprising:
    (a) providing a command to the numerically controlled machine tool to reload the pitch error correction data, in accordance with a machining program, at the time of replacing the movable part,
    (b) reloading the pitch error correction data in the numerically controlled machine tool when replacing the movable part.

2. A method according to claim 1, further comprising the steps of:
    (c) determining in response to the command whether the movable part is situated at an original position,
    (d) reloading the pitch error correction data when the movable part is at the original position, and
    (e) providing an alarm when the movable part is not at the original position.

3. A method according to claim 1, further comprising the steps of:
    (c) returning the movable part to an original position when replacing the movable part.

4. A method according to claim 1, wherein step (a) includes the sub-step of: determining the command for the reloading of the pitch error correction data by using a G code.

* * * * *